Figure 1:
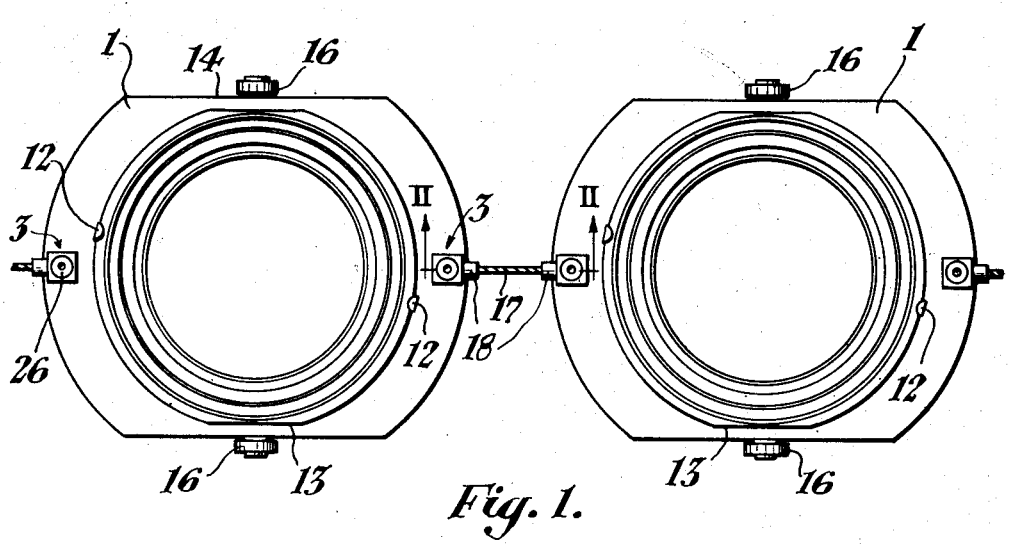

Sept. 29, 1953 W. C. MILLER 2,653,699
LINKED ENDLESS FLEXIBLE CONVEYER
Filed Feb. 23, 1950 3 Sheets-Sheet 1

INVENTOR
William C. Miller.
BY Brown, Critchlow, Flick & Peckham
HIS ATTORNEYS

Sept. 29, 1953 W. C. MILLER 2,653,699
LINKED ENDLESS FLEXIBLE CONVEYER
Filed Feb. 23, 1950 3 Sheets-Sheet 2

INVENTOR
William C. Miller.
BY Brown, Critchlow, Flick & Peckham
HIS ATTORNEYS

Sept. 29, 1953  W. C. MILLER  2,653,699
LINKED ENDLESS FLEXIBLE CONVEYER
Filed Feb. 23, 1950  3 Sheets-Sheet 3

INVENTOR.
William C. Miller.
BY
Brown, Critchlow, Flick & Peckham
HIS ATTORNEYS

Patented Sept. 29, 1953

2,653,699

UNITED STATES PATENT OFFICE 2,653,699

LINKED ENDLESS FLEXIBLE CONVEYER

William C. Miller, Pittsburgh, Pa.

Application February 23, 1950, Serial No. 145,777

4 Claims. (Cl. 198—181)

1

This invention relates to endless flexible conveyors and to methods of forming the same.

A number of endless flexible conveyors are made up of a series of articles, or material, carrying members linked one to the other by metal pins which are received in bushings formed in the carrier members. Such linked together conveyors are desirable because their parts are readily replaceable and also because the conveyor as a whole can be positively driven by means of rotating sprockets, or the like. However, the bushed pin connection used by these conveyors causes trouble, since, as will readily be appreciated, the pins rotate within their bushing causing the metal of these members to gradually wear away, or erode. The wear on each pin and bushing may be minute, but, when the amount of erosion is multiplied by the number of link connections, it often is found that the total erosion has produced a substantial elongation of the conveyor which may be beyond allowable limits.

In attempting to overcome this objectionable elongation, some conveyors are constructed from an endless section of flexible steel cable, it being obvious that such construction avoids the use of mechanical wearing parts, such as the bushed pins of the link-type conveyors. However, such endless, steel cable conveyors also elongate under strain, since there is some stretch to the cable which becomes noticeable when a cable of the requisite length is used. Also, this latter type of conveyor is objectionable in that its drive is non-positive, and also, in that it is difficult to repair or replace damaged portions of the cable.

It is therefore among the objects of this invention to provide an endless, flexible conveyor which is unusually resistant to elongation; which is formed of readily and easily replaceable parts and which is capable of being driven positively.

A further object is to provide an unusually strong, flexible conveyor that is capable of being used for long periods of time with relatively little need for maintenance and repair.

According to the invention, the conveyor is formed of a plurality of rigid links connected by pieces of prestretched flexible cable of uniform lengths. To connect the pieces of cables to the rigid links, a metal lug is securely attached to each end of each piece of cable thereby forming what can be termed a cable link, these lugs in turn being secured in a particular manner to the end portions of the rigid links.

The lugs are secured to the rigid links by forming openings in both members to receive a pin which extends through the openings into a pin

2 anchoring member, this anchoring member, most suitably, also functioning as a sprocket-engaging member through which the conveyor drive is positively imparted. Thus, the connection made is one in which the leading and trailing end portions of the rigid link are tightly clamped between lugs of cable link and sprocket-engaging members, and, it will be appreciated that such connection avoids mechanically wearing parts, such as bushed pin connections. Consequently, there is practically no conveyor elongation due to erosion. At the same time, the conveyor has ample flexibility, this being provided by the use of the steel cable to which the connecting lugs are attached.

Another feature of the invention is that the conveyor can be assembled into a precise overall length and this is due to the manner of forming the cable links, as well as the handling of the parts while the connections are made. In forming the cable links, the lugs are attached, the links mechanically straightened, and, while the links are held in such a straightened position, the lug openings are formed by means of drills, punches, or the like. It should be noted that lug openings formed in this manner may not be at the same position on each lug, but the important point is that the lug openings of each cable link are spaced lengthwise thereof the same as in all other cable links. Also, the openings of each rigid link are spaced the same as in all other rigid links.

With such cable links, accuracy of overall length of the conveyor is assured by making the pin connections while the sprocket-engaging members for each rigid link are firmly held, by means of a suitable jig, at positions which are spaced the same as the spacing of the openings in the rigid link. Most suitably, the jig, or device used to hold these members, also holds a sprocket-engaging member for one end of an adjacent rigid link at a position which is spaced from the nearest sprocket-engaging member of the first-mentioned rigid link a distance equal to the spacing of the openings of the cable link lugs.

Figure 2:
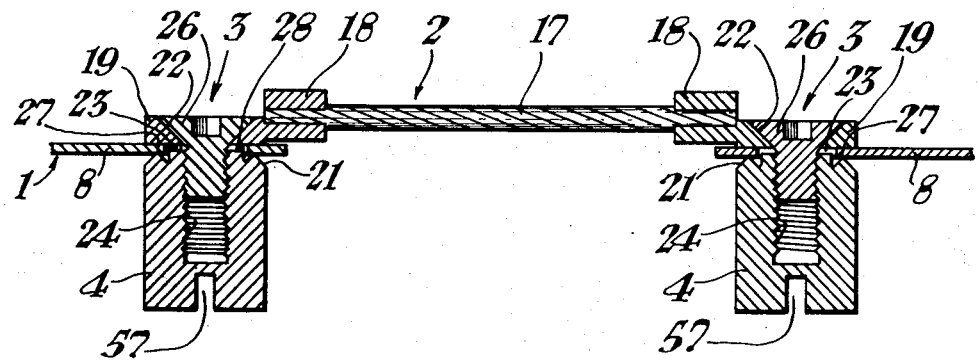
Figure 3:
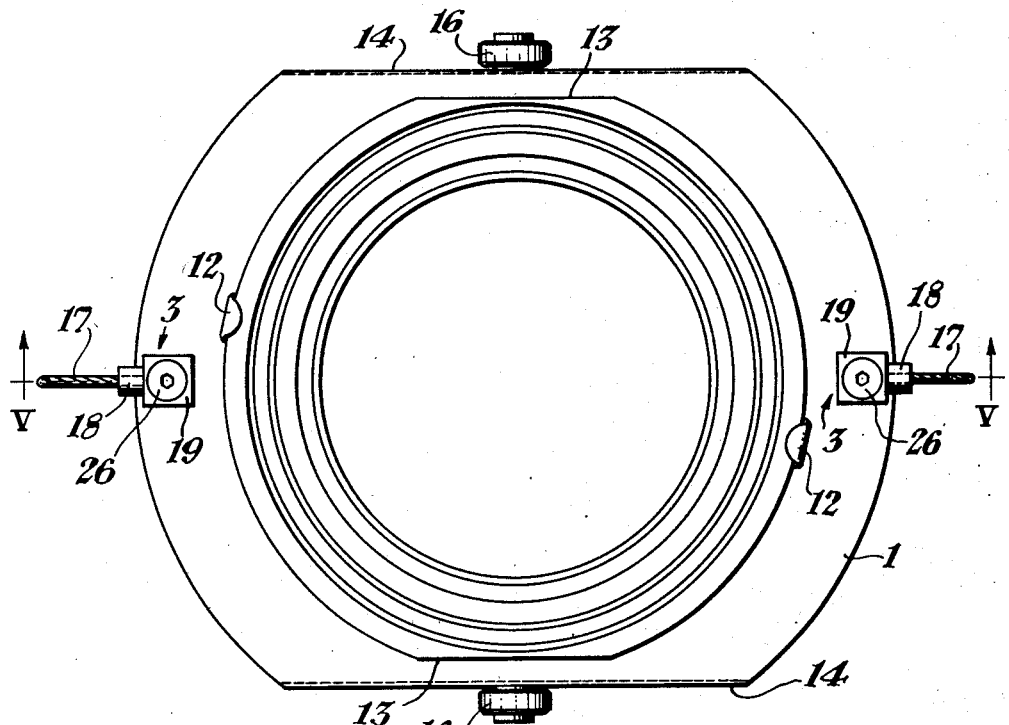
Figure 4:
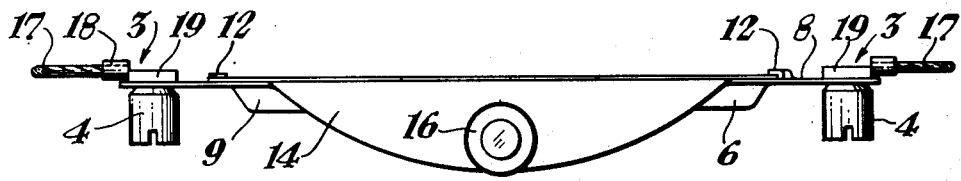
Figure 5:
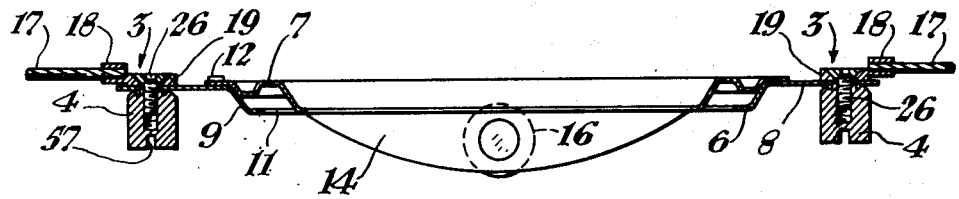
Figure 6:
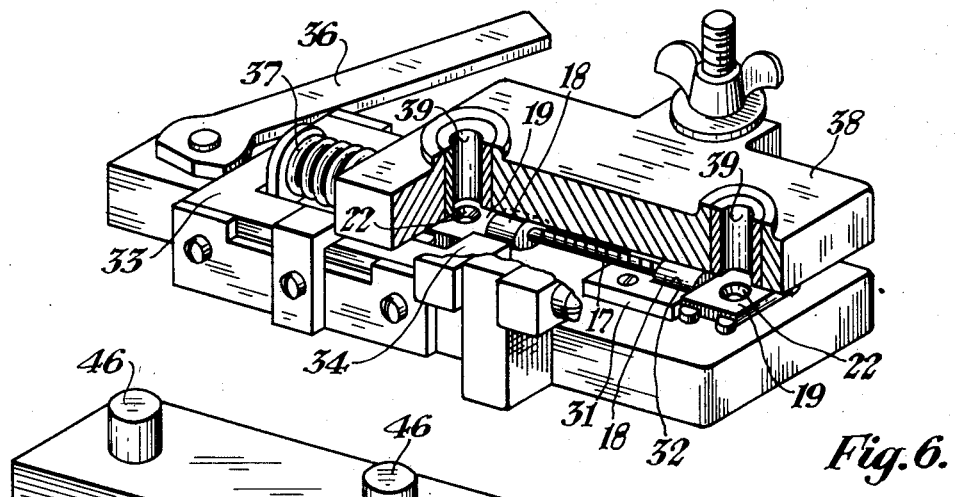
Figures 7, 10:
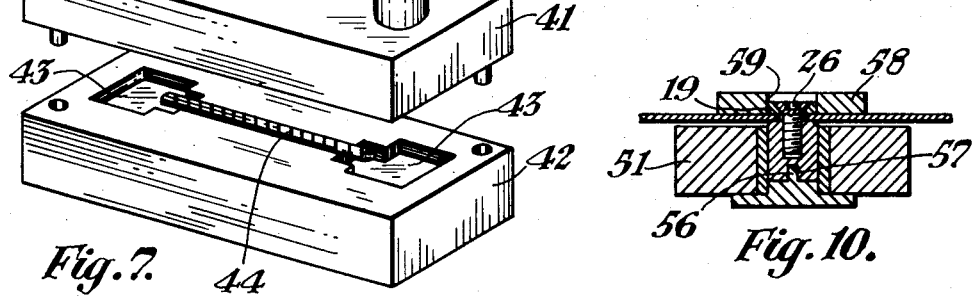
Figure 8:
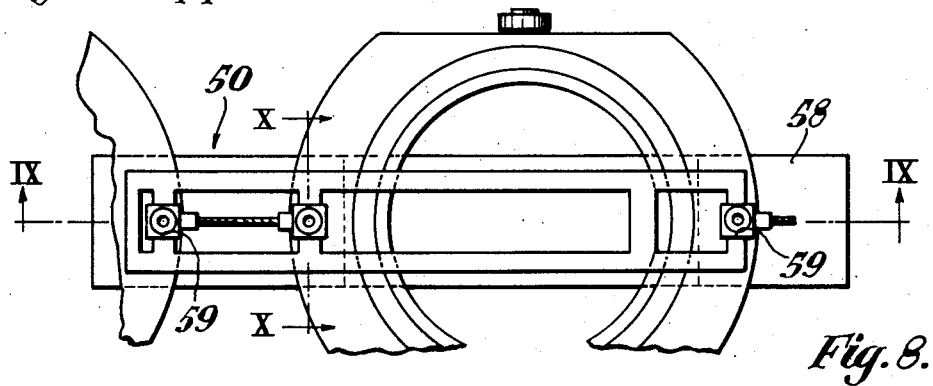

The invention is illustrated in the accompanying drawings of which Fig. 1 is a plan view of a pair of interconnected rigid links of the conveyor; Fig. 2 a vertical section along the lines II—II of Fig. 1; Figs. 3 and 4 enlarged plan and elevational views, respectively, of a single rigid link; Fig. 5 a vertical section along lines V—V of Fig. 3; Figs. 6 and 7 perspective views illustrating two different mechanisms for forming the flexible cable links of the invention; Fig. 8 a plan view of a jig used for connecting together the rigid links; and Figs. 9 and 10 vertical sections along lines IX—IX and X—X, respectively, of Fig. 8.

Referring to the drawings, and in particular to Fig. 1, it is seen that the conveyor is made up of a number of rigid articles carrying members, or links, 1 that are connected together by cable links 2, each of the cable links being provided with lugs 3 by which the cable links are connected, in a particular manner, to the rigid links. Although the improvements of this invention may be applied to almost any type of conveyor, the particular conveyor illustrated is of the type adapted to carry articles, such as pottery ware carrying molds, through a definite cycle of operations. The drive for the conveyor illustrated normally would be provided by rotating sprockets (not shown), which are formed to grip cylindrical sprocket-engaging members 4 carried at the leading and trailing ends of the rigid article carrying links; the rotation of the sprockets progressing the conveyor.

A particularly desirable article carrying member, or rigid link, 1, is illustrated in Figs. 3, 4 and 5, and, generally, it is a link formed of two parts, one of which is insertable in the other; such construction being for the purpose of permitting articles of different sizes to be carried by the conveyor. Referring to these figures, this preferred rigid link 1 is formed of a carrier member 6 and a detachable and replaceable insert member 7. Member 6 has horizontal peripheral flanges 8 by means of which it is connected into the conveyor, and a recessed central portion 9 provided with a wide opening 11. Also, upwardly-extending, bent lugs 12 are formed on member 6 for holding insert 7 in place and, as can be noted in Fig. 3, insert 7 has flat side walls 13 the width of which is less than the spacing between lugs 12, so that the flat walls can be placed between the lugs and the insert and then rotated into a position in which it is grasped by the bent lugs. With such an arrangement, when it is desired to handle an article of a different size, insert 7 can be removed and other inserts of appropriate size substituted. Also, members 6 of rigid link 1 each have flat side walls 14 on which are mounted rollers 16, which ride on a track, or any suitable horizontal surface, so as to support the conveyor in its travel.

Referring again to Figs. 1 and 2, cable links 2 each includes a piece of prestretched, commercial steel cable 17, the length of each of these cables being substantially the same in all of the cable links. The ends of each cable are secured in lugs 3 and, for this purpose, the lugs are formed with cylindrical portions 18 in which the ends of the cables are secured by swedging, welding, brazing, or other means to be described. If desired, the cable ends may be secured in cylindrical portion 18 of the lugs in such a manner that the connection will fail at a predetermined overload. These lugs, preferably, are formed of malleabilized castings and include, as integral members with portions 18, flat surfaced portions 19, the lower surfaces of which engage horizontal flanges 8 of rigid links 1. As best seen in Fig. 2, the connections of rigid links 1 to cable links 2 are made by clamping horizontal flanges 8 of the rigid links between portions 19 of lugs 3 and upper ends 21 of sprocket engaging members 4. To make the connection, portion 19 of each lug is provided with a tapered opening 22, while the outer ends of each rigid link 1 is provided with openings 23 and each sprocket engaging member 4 is centrally tapped and threaded to form a threaded bore 24 therein. With openings 22, 23 and bore 24 substantially aligned, pins, or screwbolts 26 are inserted through these openings and anchored in the bore of the sprocket-engaging members, this connection pulling the sprocket engaging members up against the bottom surface of the ends of rigid links 1 to form the clamping connection. As may be noted, upper ends 21 of the sprocket engaging members are knurled, or ridged, to provide sharp points 27 which dig into the bottom surface of the rigid link and prevent lineal slippage between the rigid links and the cable links. Also, it is desirable, for reasons to be stated, to provide upper ends 21 of the sprocket engaging members with centrally raised shoulders 28.

Regarding the above-described connection between the rigid links and the cable links, it is important to note that the arrangement is such that there is no relative movement between the connecting members so that wear or erosion of these members is avoided. Nevertheless, the conveyor formed by links connected in this manner has fully as much flexibility as prior conveyors, this flexibility being provided by steel cables 17. As a result, a flexible conveyor is provided which is unusually resistant to elongation during use.

Another important feature of the invention is the provision of an assembled conveyor of a precise overall length, this precision depending upon forming cable links of precisely uniform effective length, as well as upon the handling of the rigid links, cable links and sprocket engaging members while the connections are being made. Generally, cable links of substantially uniform length are formed by first straightening the cable link, and then, while the link is held in such a straightened position, drilling or otherwise forming tapered openings 22 in portions 19 of lugs 3, the drills or punches for forming these openings being rigidly held spaced apart the same distance as that desired for the effective length of the cable links. It will be appreciated that openings 22 may not be formed in the same position in each of portions 19 of lugs 3, but nevertheless the center to center spacing of openings 22 will be precisely the same for all cable links, and it is this center to center spacing which determines the effective length of these cable links.

Tapered openings 22 of the lugs may be formed by using the mechanism illustrated in either Fig. 6 or Fig. 7, although other manners of forming these openings may be devised and such are intended to be included within the scope of the invention.

The mechanism illustrated in Fig. 6 is a jig that is provided with a stationary block 31 in which is formed notch 32 shaped to closely receive cylindrical portion 18 of a lug of a cable link. Also, the jig is provided with a sliding block 33 provided at its inner end with shoulders 34 formed to bear against flat portion 19 of a lug of a cable link. Sliding member 33 is actuated by a lever 36 which, when swung counterclockwise from its position shown in Fig. 6, forces sliding block 33 inwardly against the pressure of a compression spring 37. Also, the jig is provided with a hinged cover plate 38 which has formed in it, at precisely spaced positions, drill-receiving openings 39. To form tapered openings 22 in the lugs of a cable link, hinged cover 38 is raised and sliding plate 33 moved inwardly to permit a cable link to be positioned, as shown in Fig. 6, in the jig. Lever 36 then is released and sliding plate 33 is moved outwardly by compression spring 37, this outward movement causing the shoulders 34 of the sliding plate to engage flat surfaced portion 19 of a lug of the cable link and to pull the lug so engaged away from the lug at the opposite end of the cable link; it being noted that this lug at the opposite end is held by block 31. This pull on the lug stretches the cable link so as to assure that the link is straightened. The final step then is to close cover plate 38 and drill tapered openings 22 by the use of suitable drills closely received in openings 39 in the cover plate, and it will be recognized that such a manner of forming openings 22 assures precisely the same center to center spacing of these openings in all cable links.

Another manner of forming openings 22 in the lugs is by core-forming openings in die-cast lugs, mechanism for such operations being diagrammatically illustrated by Fig. 7. The mechanism there shown includes upper and lower members 41 and 42, these members between them forming dies 43 shaped into the form desired for lugs 3. Also, extending longitudinally between dies 43 is a slot shaped to receive a length of cable which forms part of the cable link. In the cable link forming operation, a length of cable first is inserted into slot 44 and upper member 41 then pressed against lower member 42. Molten metal next is injected into the dies and finally plungers 46 are forced into the molten metal to provide tapered holes 22 in the lugs. Plungers 46, of course, are spaced apart the precise distance desired for the center to center spacing of lug holes 22 and, since the flexible cable of the cable link is completely straightened, or flattened, by the pressure between members 41 and 42, each cable link formed by this mechanism has its lug openings precisely spaced.

Figure 9:
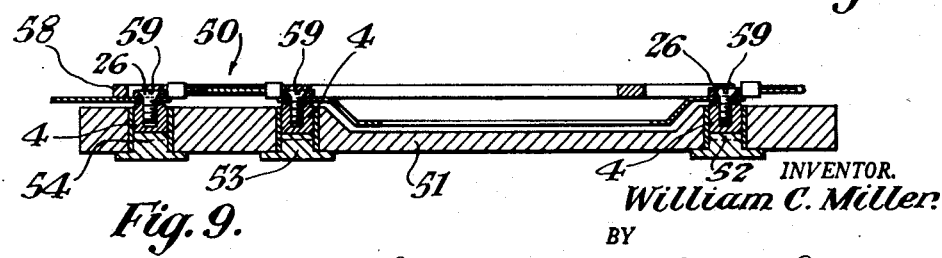

With cable links formed in either of the above described manners, further assurance of accuracy of the overall length of the conveyor is provided by use of an assembly wrench or jig 50 illustrated by Figs. 8, 9 and 10. This jig includes a lower block 51 which is bored at three spaced positions to form sprocket-engaging member receiving holes 52, 53 and 54. In assemblage of the cable links and rigid links, three sprocket-engaging members 4 are inserted, one into each of these holes, and it will be noted that the bottom of each of these holes is provided with an upwardly extending shoulder 56 adapted to fit into a notch 57 formed in the bottom end of each of the sprocket-engaging members; the purpose of this shoulder engagement of the sprocket engaging members being to prevent rotation of these members while pins 26 are being screwed into pin-anchoring engagement with them. Further, holes 52 and 53 are spaced the same as the center to center spacing of openings 23 of rigid link 1, it being understood that these openings 23 are spaced a uniform distance apart in all of the rigid links. Also, holes 53 and 54 are spaced apart the same distance as the previously described effective length of cable links 2. Consequently, with the sprocket-engaging members 4 so held in the spaced holes of block 51, rigid links 1 may be placed over the sprocket-engaging members, centrally raised shoulder 28 of the sprocket-engaging assisting in aligning the centers of openings 23 of the rigid links with the sprocket-engaging member. Lugs 3 of the cable links then are placed over the ends of rigid links 1 and screw-bolts 26 driven into link-connecting anchorage.

The purpose of providing lugs 3 with their tapered openings 22 is to eliminate any elongation due to tolerances between the heads of the pins and the openings in the lugs. In other words, if openings 22 and heads of the pins were circular, there would be a certain tolerance or play between the lugs and the heads of the pins, and the tapering of these openings avoids this play. It also is desirable to incorporate an upper wrench member 58 in jig 50, this wrench being provided with shoulders 59 (Fig. 10) which engage the sides of portions 19 of the lugs when the cable links are placed in position to be connected to the rigid links.

Summarizing the above description, accuracy of the overall length of the conveyor is assured first because the effective length of each cable link is the same and next because the connections between each rigid link 1 and cable link 2 is made while the sprocket-engaging members are held in jig 50. Viewed in another manner, if openings 22 in lugs 3 of the cable links were not formed with such precision, a jig, including holes 54 and 53 spaced precisely the same as openings 22 of a cable link, could not be used because openings 22 might not align precisely with the holes. Further, the use of a jig with holes 54 and 53 assures that the axes of the connecting pins 26 for each rigid link are spaced apart the same distance in that link as in all other rigid links. Consequently, this forming and assemblage method assures a conveyor of accurate overall length. Further, this length is maintained during operation because there is no wear, or erosion, between connecting pins 26, lugs 3 and sprocket-engaging members.

According to the provisions of the patent statutes, I have explained the principle, preferred embodiment and mode of operation of my invention, and have illustrated and described what is now considered to represent its best embodiment. However, I desire to have it understood that, within the scope of the appended claims, the invention may be practiced otherwise than as specifically illustrated and described.

I claim:

1. An endless flexible conveyor comprising a series of rigid links each provided at its leading and trailing ends with an opening, said openings being spaced apart the same in each rigid link, a sprocket-engaging member disposed beneath each opening and engaging the surface surrounding the opening, flexible cable links connecting adjacent rigid links, each of said cable links including a fixed length of cable having a lug secured to each of its ends, said lugs each being provided with an opening substantially axially aligned with a rigid link opening, said lug openings being spaced lengthwise of each cable link the same as in all other cable links and the portion of each lug surrounding its opening engaging the surface surrounding an opening of a rigid link, and a pin extending through each of said aligned lug and rigid link openings into one of said sprocket-engaging members for immovably clamping each of said rigid links between said engaging surfaces of the lugs and the sprocket-engaging members.

2. An endless flexible conveyor comprising a series of rigid links each provided at its leading and trailing ends with an opening, said openings being spaced apart the same in each rigid link, a sprocket-engaging member disposed beneath each opening and engaging the surface surrounding the opening, flexible cable links connecting adjacent rigid links, each of said cable links including a fixed length of cable having a lug secured to each of its ends, said lugs each being provided with a tapered opening substantially axially aligned with a rigid link opening, said lug openings being spaced lengthwise of each cable link the same as in all other cable links and the portion of each lug surrounding its opening engaging the surface surrounding an opening of a rigid link, and a screw-bolt extending through each of said aligned lug and rigid link openings into one of said sprocket-engaging members for immovably clamping each of said rigid links between said engaging surfaces of the lugs and the sprocket-engaging members, said screw bolts having heads provided with tapered sides and adapted to be tightly received in said tapered openings to prevent elongation of the conveyor due to tolerances in the fit of said screw bolts.

3. An endless flexible conveyor comprising a series of rigid links each provided at its leading and trailing ends with an opening, said openings being spaced apart the same in each rigid link, a sprocket-engaging member disposed beneath each opening and engaging the surface surrounding the opening, flexible cable links connecting adjacent rigid links, each of said cable links including a fixed length of cable having a lug secured to each of its ends, said lugs each being provided with an opening substantially axially aligned with a rigid link opening, said lug openings being spaced lengthwise of each cable link the same as in all other cable links and the portion of each lug surrounding its opening engaging the surface surrounding an opening of a rigid link, and a pin extending through each of said aligned lug and rigid link openings into one of said sprockets-engaging members for immovably clamping each of said rigid links between said engaging surfaces of the lugs and the sprocket-engaging members, the engaging surfaces of said sprocket-engaging members being roughened and embedded in said rigid links to prevent lineal slippage in said clamp.

4. An endless flexible conveyor comprising a series of rigid links each provided at its leading and trailing ends with an opening, said openings being spaced apart the same in each rigid link, a sprocket-engaging member disposed beneath each opening and engaging the surface surrounding the opening, flexible cable links connecting adjacent rigid links, each of said cable links including a fixed length of cable having a lug secured to each of its ends, said lugs each being provided with a tapered opening substantially axially aligned with a rigid link opening, said lug opening being spaced lengthwise of each cable link the same as in all other cable links and the portion of each lug surrounding its opening engaging the surface surrounding an opening of a rigid link, and a screw-bolt extending through each of said aligned lug and rigid link openings into one of said sprocket-engaging members for immovably clamping each of said rigid links between said engaging surfaces of the lugs and the sprocket-engaging members, said screw-bolts having heads provided with tapered sides and adapted to be tightly received in said tapered openings to prevent elongation of the conveyor due to tolerances in the fit of said screw-bolts, and said engaging surfaces being roughened and embedded in said rigid links to prevent lineal slippage in said clamp.

WILLIAM C. MILLER.

References Cited in the file of this patent

UNITED STATES PATENTS

| Number | Name | Date |
|---|---|---|
| 818,595 | Wilcox | Apr. 24, 1906 |
| 1,956,312 | Browning | Apr. 24, 1934 |
| 2,041,809 | Bernhard | May 26, 1936 |
| 2,304,194 | Payne | Dec. 8, 1942 |
| 2,437,702 | Miller et al. | Mar. 16, 1948 |